(12) United States Patent
Karr et al.

(10) Patent No.: US 7,561,897 B2
(45) Date of Patent: *Jul. 14, 2009

(54) SYSTEM AND APPARATUS FOR PERFORMING BROADCAST AND LOCALCAST COMMUNICATIONS

(75) Inventors: Lawrence J. Karr, Santa Monica, CA (US); William H. Mitchell, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 372 days.

This patent is subject to a terminal disclaimer.

(21) Appl. No.: 10/713,625

(22) Filed: Nov. 13, 2003

(65) Prior Publication Data

US 2004/0102214 A1 May 27, 2004

Related U.S. Application Data

(62) Division of application No. 10/044,294, filed on Oct. 26, 2001.

(60) Provisional application No. 60/302,831, filed on Jul. 3, 2001.

(51) Int. Cl.
*H04B 1/38* (2006.01)
*H04M 13/00* (2006.01)
*H04J 9/00* (2006.01)
*H04W 4/00* (2009.01)

(52) U.S. Cl. ............... 455/561; 455/102; 455/422.1; 455/426.1; 714/746; 714/786; 370/204; 370/328; 375/240.24

(58) Field of Classification Search ............... 455/550, 455/552.1, 553.1, 41.1, 41.2, 41.3, 102, 108, 455/110, 561; 370/203, 204, 319–321, 464; 714/746, 786, 798; 375/295, 298, 300, 302, 375/219, 223

See application file for complete search history.

(56) References Cited

U.S. PATENT DOCUMENTS

| 4,450,588 | A | * | 5/1984 | Rohrich et al. | 455/192.1 |
| 4,665,519 | A | | 5/1987 | Kirchner et al. | 370/94 |
| 4,692,894 | A | | 9/1987 | Bemis | 710/57 |
| 4,761,796 | A | | 8/1988 | Dunn et al. | 375/1 |
| 4,856,003 | A | * | 8/1989 | Weng | 714/784 |

(Continued)

FOREIGN PATENT DOCUMENTS

WO      WO 95/22233      8/1995

(Continued)

*Primary Examiner*—Duc M Nguyen
(74) *Attorney, Agent, or Firm*—Merchant & Gould, P.C.

(57) ABSTRACT

Described is a communication system including mobile communication devices. In the described system, the mobile devices may be wrist-worn watches such as are in common use today, except that the watches are specially configured to receive data in a "broadcast" mode and transmit and/or receive data in a "localcast" mode. The localcast mode includes the ability to transmit and receive data in a peer-to-peer fashion, allowing mobile devices to communicate directly with each other. The ability to combine two of these communication modes in a small, integrated and hence inexpensive and low-power package provides many advantages over existing personal communication device solutions.

20 Claims, 12 Drawing Sheets

U.S. PATENT DOCUMENTS

| | | | | |
|---|---|---|---|---|
| 4,862,516 | A | * | 8/1989 | Macnak et al. ............ 455/193.1 |
| 4,910,511 | A | | 3/1990 | Nagata et al. ......... 340/825.44 |
| 5,038,405 | A | | 8/1991 | Karr ............................ 455/197 |
| 5,046,066 | A | | 9/1991 | Messenger ................. 370/94.1 |
| 5,168,271 | A | * | 12/1992 | Hoff ........................... 340/7.43 |
| 5,301,358 | A | * | 4/1994 | Gaskill et al. ............ 455/193.2 |
| 5,440,559 | A | * | 8/1995 | Gaskill ........................ 370/314 |
| 5,442,646 | A | * | 8/1995 | Chadwick et al. ........... 714/795 |
| 5,465,403 | A | | 11/1995 | Owaki ..................... 455/186.1 |
| 5,479,595 | A | | 12/1995 | Israelsson ................... 359/145 |
| 5,483,688 | A | * | 1/1996 | English et al. ............ 455/184.1 |
| 5,487,089 | A | * | 1/1996 | Misaizu et al. .............. 375/296 |
| 5,548,814 | A | * | 8/1996 | Lorang et al. ................ 370/310 |
| 5,552,779 | A | | 9/1996 | Gaskill et al. .......... 340/825.44 |
| 5,570,369 | A | * | 10/1996 | Jokinen ....................... 370/311 |
| 5,572,442 | A | | 11/1996 | Schulhof et al. ............ 709/219 |
| 5,694,404 | A | | 12/1997 | Huang ........................ 714/751 |
| 5,722,084 | A | | 2/1998 | Chakrin et al. .............. 455/551 |
| 5,732,333 | A | * | 3/1998 | Cox et al. .................... 455/126 |
| 5,742,623 | A | | 4/1998 | Nuber et al. ................. 371/47.1 |
| 5,757,782 | A | | 5/1998 | Gaskill ........................ 370/313 |
| 5,854,985 | A | | 12/1998 | Sainton et al. ............... 455/553 |
| 5,884,140 | A | | 3/1999 | Ishizaki et al. .................. 455/2 |
| 5,890,054 | A | | 3/1999 | Logsdon et al. ............. 455/11.1 |
| 5,903,618 | A | | 5/1999 | Miyake et al. ............... 375/356 |
| 5,913,163 | A | | 6/1999 | Johansson .................... 455/426 |
| 5,928,322 | A | | 7/1999 | Bitar et al. ....................... 709/4 |
| 5,949,822 | A | | 9/1999 | Hancharik ................... 375/242 |
| 5,968,198 | A | | 10/1999 | Hassan et al. ............... 714/752 |
| 5,974,034 | A | | 10/1999 | Chin et al. ................... 370/328 |
| 6,012,159 | A | | 1/2000 | Fischer et al. ............... 714/755 |
| 6,060,996 | A | * | 5/2000 | Kaiser et al. ................ 340/7.28 |
| 6,081,202 | A | * | 6/2000 | Dorenbosch ................. 340/7.3 |
| 6,088,577 | A | | 7/2000 | Yang et al. .................... 455/45 |
| 6,101,168 | A | | 8/2000 | Chen et al. .................. 370/228 |
| 6,111,896 | A | | 8/2000 | Slattery et al. ............... 370/535 |
| 6,148,193 | A | * | 11/2000 | Miska et al. ................. 455/410 |
| 6,192,068 | B1 | | 2/2001 | Fattouche et al. ............ 375/130 |
| 6,192,253 | B1 | * | 2/2001 | Charlier et al. .......... 455/575.7 |
| 6,212,414 | B1 | | 4/2001 | Alameh et al. ............... 455/575 |
| 6,233,711 | B1 | * | 5/2001 | Murayama et al. .......... 714/786 |
| 6,370,394 | B1 | | 4/2002 | Anttila ........................ 455/556 |
| 6,396,531 | B1 | | 5/2002 | Gerszberg et al. ........ 348/14.01 |
| 6,501,939 | B1 | * | 12/2002 | Dent .......................... 455/11.1 |
| 6,542,751 | B1 | | 4/2003 | Blink et al. .................. 455/458 |
| 6,567,397 | B1 | * | 5/2003 | Campana, Jr. et al. ....... 370/349 |
| 6,567,471 | B1 | | 5/2003 | Yoshinari ............... 357/240.26 |
| 6,611,755 | B1 | | 8/2003 | Coffee et al. ................. 701/213 |
| 6,671,284 | B1 | | 12/2003 | Yonge et al. ................. 370/462 |
| 6,704,368 | B1 | | 3/2004 | Nefedov ..................... 375/265 |
| 6,725,412 | B1 | * | 4/2004 | Smithers et al. ............. 714/758 |
| 6,744,744 | B1 | | 6/2004 | Tong et al. ................... 370/320 |
| 6,778,596 | B1 | | 8/2004 | Tzannes ...................... 375/222 |
| 6,862,445 | B1 | | 3/2005 | Cohen ..................... 455/412.1 |
| 6,907,234 | B2 | * | 6/2005 | Karr et al. ................. 455/193.1 |
| 6,928,066 | B1 | | 8/2005 | Moon et al. ................. 370/342 |
| 6,940,864 | B2 | | 9/2005 | Abdelilah et al. ............ 370/412 |
| 6,950,642 | B2 | * | 9/2005 | Karr ........................... 455/296 |
| 6,973,072 | B1 | * | 12/2005 | Muntz ........................ 370/351 |
| 7,023,910 | B1 | | 4/2006 | Norrell ....................... 375/222 |
| 7,349,675 | B2 | * | 3/2008 | Karr et al. ................... 455/102 |
| 7,349,691 | B2 | | 3/2008 | Karr et al. ................. 455/422.1 |
| 7,421,044 | B2 | | 9/2008 | Cameron et al. ............. 375/340 |
| 2002/0051499 | A1 | | 5/2002 | Cameron et al. ............. 375/295 |
| 2002/0061024 | A1 | * | 5/2002 | Malkemes et al. ........... 370/401 |
| 2002/0071505 | A1 | | 6/2002 | Cameron et al. ............. 375/341 |
| 2002/0090938 | A1 | * | 7/2002 | Dharia et al. ................ 455/422 |
| 2002/0126763 | A1 | | 9/2002 | Jeong et al. .................. 375/295 |
| 2002/0194570 | A1 | * | 12/2002 | Birru et al. ................... 714/792 |
| 2003/0099303 | A1 | | 5/2003 | Birru et al. ................... 375/265 |
| 2003/0105913 | A1 | | 6/2003 | Lee ................................ 711/5 |
| 2003/0109253 | A1 | | 6/2003 | Fenton et al. ................ 455/422 |
| 2005/0052571 | A1 | | 3/2005 | Ghosh ..................... 348/426.1 |
| 2005/0201368 | A1 | | 9/2005 | Periyalwar et al. .......... 370/356 |
| 2006/0150059 | A1 | | 7/2006 | Modlin ....................... 714/755 |

FOREIGN PATENT DOCUMENTS

| | | |
|---|---|---|
| WO | WO 00/28680 | 5/2000 |

\* cited by examiner

SYSTEM AND APPARATUS FOR PERFORMING BROADCAST AND LOCALCAST COMMUNICATIONS

RELATED APPLICATIONS

This application is a divisional of application Ser. No. 10/044,294, filed Oct. 26, 2001, which claims the benefit of U.S. provisional application No. 60/302,831, filed Jul. 3, 2001, which applications are incorporated herein by reference.

BACKGROUND OF THE INVENTION

As society becomes increasingly mobile, mobile computing devices are enjoying a tidal wave of popularity and growth. Cell phones, wireless PDAs, wireless laptops and other mobile communication devices are making impressive inroads with mainstream customers. Constraining this growth and limiting customer satisfaction, however, is the lack of a truly adequate high-coverage-area, inexpensive, small, battery-efficient wireless communication system. Cellular data-transmit telephony-based solutions are far from power-efficient, and impose (relative) cost and size burdens that make them unusable. Likewise, other attempts to solve these problems have proved equally unsuitable. For instance, a few entities have attempted to make use of mobile devices that receive information over Frequency Modulated (FM) subcarriers. FM subcarriers (also known as "SCA" for Subsidiary Communications Authorization) utilize the available frequencies above FM stereo within the available modulation bandwidth of an FM station. Subcarriers are typically leased by radio stations, subject to FCC or other national regulation.

Some examples of FM subcarrier systems include the QUOTREK system owned and maintained by the Data Broadcast Corporation (DBC) to deliver stock price quotes to a handheld mobile device. However, the QUOTREK system is a single purpose system limited to receiving stock quotes. The system has various other limitations that make it unusable as a mobile computing device. Likewise, the Seiko Corporation implemented an FM subcarrier system wherein short messages were transmitted to a wrist-worn device. However, the hardware and communications scheme used were relatively primitive, resulting in a need for excessive redundancy in message transmission. These and other shortcomings rendered the Seiko system less than acceptable. Similarly, certain paging systems are based on FM subcarrier use, such as the Radio Data System (RDS) or Mobile Broadcasting System (MBS) systems. However, those systems involve short messages transmitted in a broadcast fashion with limited data rates. Unfortunately, an acceptable mobile device solution has eluded those skilled in the art.

SUMMARY OF THE INVENTION

The present invention provides a mobile device that includes two wireless communications modes, a wide area mode in which data may be broadcast over a large area and to many mobile devices, and a local area mode in which data is transmitted over a local area. In one embodiment, a broadcast mode is used to broadcast data over a Frequency Modulated (FM) subcarrier system, such as in unused portions of an FM radio stations bandwidth. In addition, a localcast mode is used to transmit information over a relatively short range, such as within an office or on a corporate campus. A mobile device, such as a specially configured watch, receives the transmissions in either the broadcast mode or localcast mode. In alternate embodiments, the mobile device may be operated as a stand-alone paging or messaging subscriber unit, or built into a mobile telephony device such as a cellular telephone. Advantageously, the mobile device is not limited to the use of either a wide area transmission system (such as a cellular network), or a local area transmission system (such as an infrared communication link), but, rather, reaps the benefits of both. A user may take advantage of the local area transmission system to receive information from the user's personal computer or another mobile device. The user may also take advantage of the wide area transmission system to receive information of a more general interest, such as may be transmitted over a broadcast medium, such as stock quotes and the like. Localcast mode is also useful to provide or enhance information transmission in areas where normal broadcasts cannot be received or reception is poor.

In one aspect, the present invention provides a mobile device configured to receive wireless transmissions in both a broadcast mode and a localcast mode. The mobile device is configured to receive broadcast data over an FM subcarrier communication link. The broadcast data is time diverse and includes synchronization information to allow the mobile device to accurately receive the broadcast data. The mobile device is configured to receive localcast data, transmitted by a localcast transmitter, over a locally-unused portion of the FM band. In this way, the mobile device makes use of the same radio electronics to communicate in both broadcast and localcast modes, thereby reducing size and power consumption.

In another aspect, the mobile device is configured to communicate in a peer-to-peer fashion by transmitting information to and receiving information from other mobile devices over a localcast communication link. The mobile device transmits and receives information in a locally-unused FM band. In this way, information may be shared between two or more mobile devices in a manner similar to that of mobile devices and laptops or personal computers communicating over IRDA infrared, without a need for additional communication components or circuitry.

In yet another aspect, the present invention provides a localcast transmitter configured to transmit data over a local area and in a locally-unused portion of the FM band. The localcast transmitter may be connected to a personal computer or the like and configured to transmit data to and receive data from a mobile device.

In still another aspect, the present invention provides a communication system in which a mobile device is in dual-mode communication with the system. In a first (broadcast) mode, information is broadcast over a wide area on a predetermined schedule. A mobile device may be scheduled to receive the broadcast information based on the predetermined schedule. Other information may additionally be transmitted in a second (localcast) mode over a much smaller area. The mobile device is further configured to transmit and receive information over the localcast mode.

DETAILED DESCRIPTION OF THE PREFERRED EMBODIMENT

The present invention is described in the context of a communication system including mobile communication devices. In the described embodiment, the mobile devices are wrist-worn watches such as are in common use today, except that the watches are specially configured to communicate in both a "broadcast" mode and a "localcast" mode, as is described in greater detail below. The ability to communicate in the two modes provides many advantages over existing personal communication devices, as will become apparent from a reading of the following detailed description. Likewise, minor deviations from the described embodiments will also become apparent without departing from the spirit of the invention.

Figure 1:
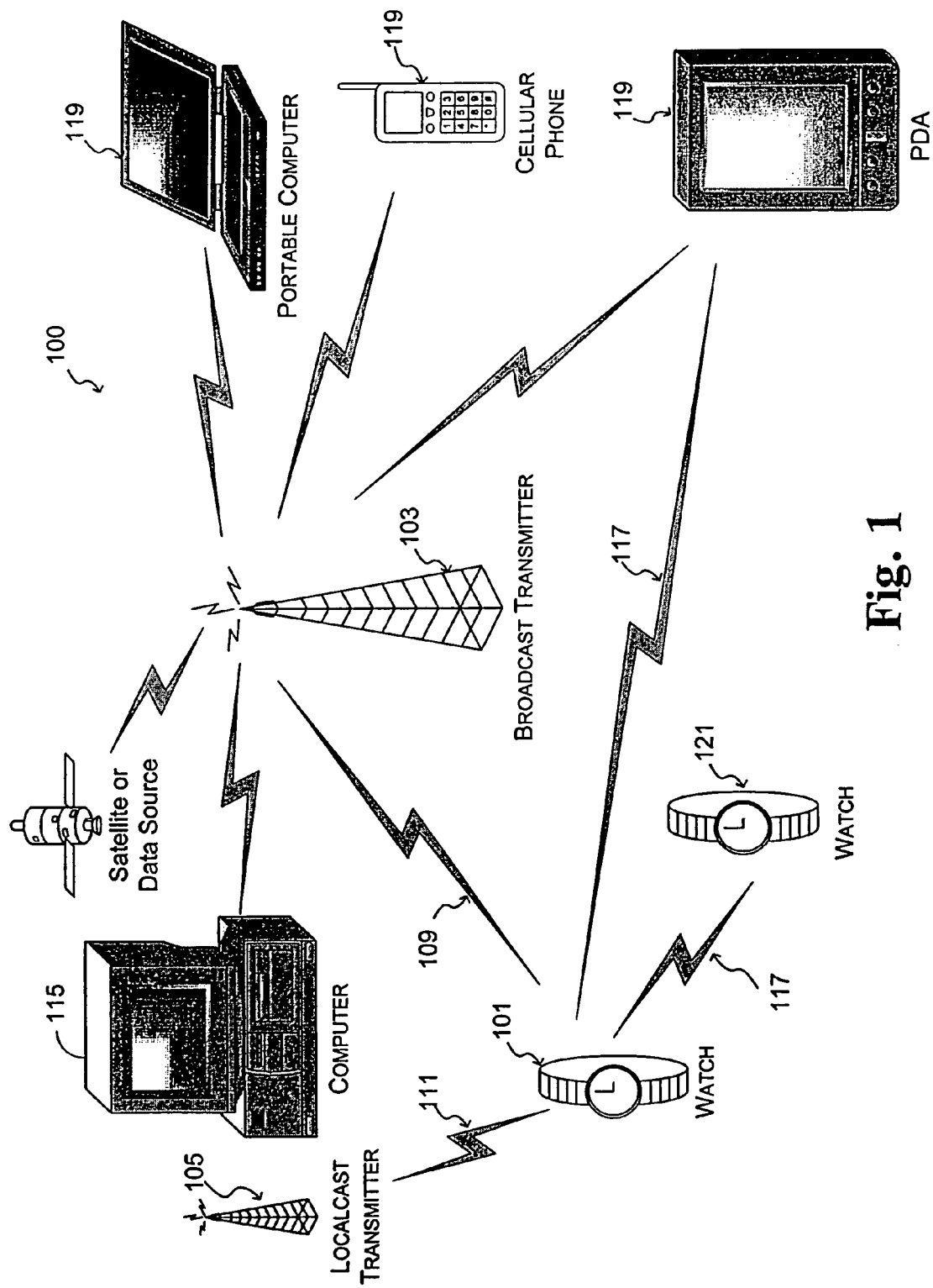
FIG. 1 is a functional block diagram of a sample communication environment in which the present invention may be implemented.

FIG. 1 is a functional block diagram of a sample communication system 100 that benefits from the teachings of the present invention. The disclosed communication system 100 includes three main operating components: a watch 101, a broadcast transmitter 103, and a localcast transmitter 105. As is illustrated in FIG. 1, the broadcast transmitter 103 transmits broadcast signals (e.g., broadcast signal 109), over FM subcarriers, to a number of mobile or fixed devices, including the watch 101 and a computer 115. The computer 115 may be attached to the localcast transmitter 105 and transmits localcast signals (e.g., localcast signal 111) to mobile devices in the immediate vicinity of the computer 115. The localcast transmitter may also be configured to connect directly to the Internet through, for example, an Ethernet connection. The watch 101, broadcast transmitter 103, and localcast transmitter 105 are each described in greater detail below in conjunction with FIGS. 2-4.

The disclosed communication system 100 has three main operating modes: a subcarrier broadcast mode ("broadcast"), a localcast mode ("localcast"), and a Peer-to-Peer mode ("Peer-to-Peer"). Although introduced here for the purpose of discussion, each of these modes of operation is described in detail later. The normal operation of the watch 101 is receiving data broadcast via FM subcarrier (e.g., broadcast signal 109). A local direct FM "localcast" receiving mode is also available (e.g., localcast signal 111). Watches may also be set to communicate with nearby watches 121, other mobile devices 119, or even fixed computer systems, one-on-one, in a half-duplex two-way messaging mode as illustrated by localcast signals 117. Lastly, application data can be transferred to the watch during a localcast session. In addition, although described here in the context of a watch-based system, it will be apparent that the teachings of the application have equal applicability to many other mobile devices, such as portable computers, personal digital assistants (PDAs), cellular telephones, and the like. The use of a watch is for illustrative purposes only to simplify the following discussion, and may be used interchangeably with "mobile device."

Figure 2:
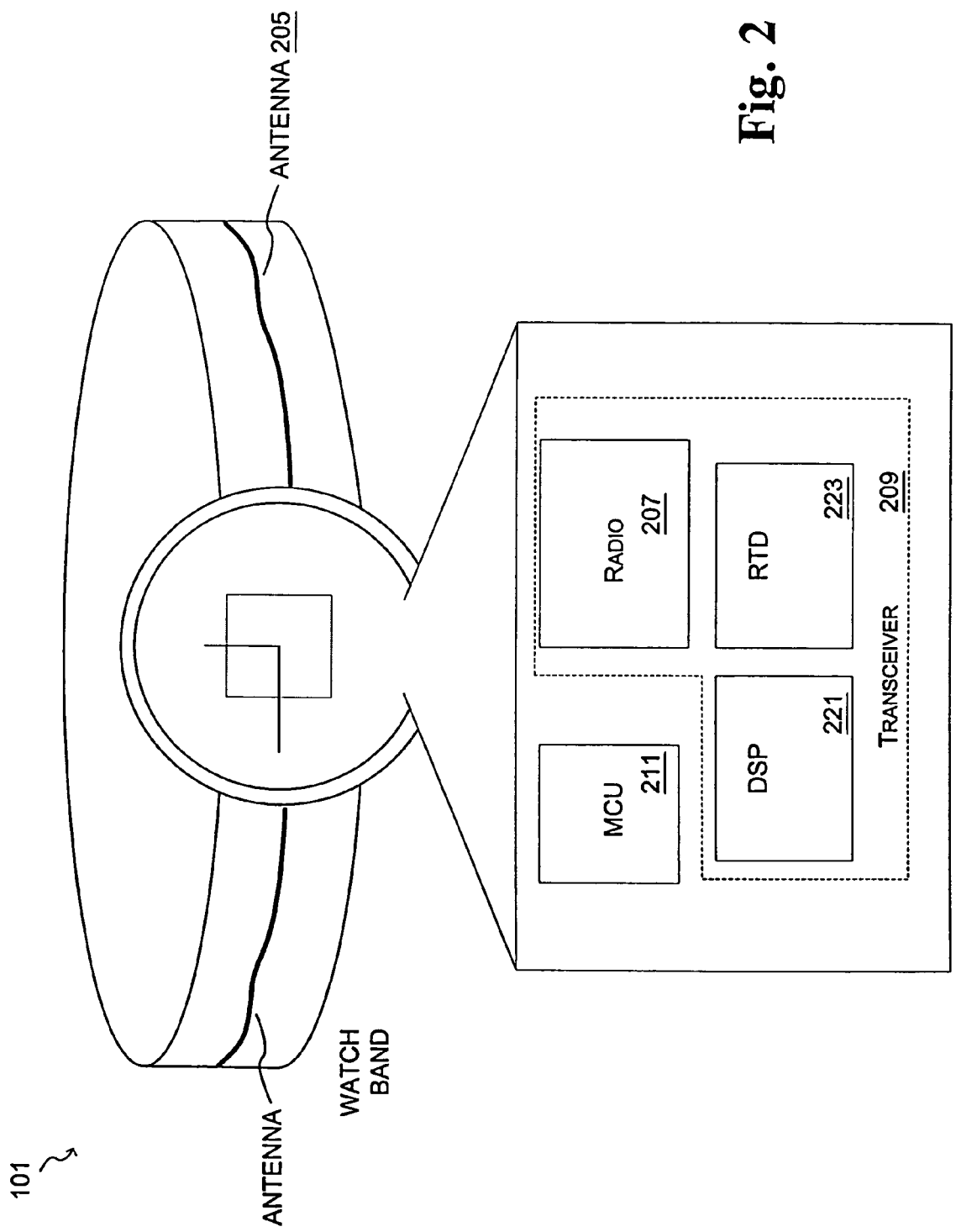
FIG. 2 is a functional block diagram illustrating one implementation of the invention in a wrist-worn mobile device, such as a watch.

Turning to FIG. 2, the watch 101 is composed of four sub-components: a wrist-loop watchband antenna 205, an analog radio 207, a digital transceiver 209, and a MicroComputer assembly (the "MCU") 211. In this embodiment, the antenna 205 includes a watchband loop antenna and discrete analog tuning elements. The antenna 205 may be a conducting loop embedded in the watchstrap. In this embodiment, the conducting loop is a small loop antenna. For the wrist-worn mobile devices, the selectivity (or "Q") of the antenna may be less than ideal due to the relatively poor ratio of the size of the antenna (e.g., roughly the length of the wristband) to the wavelength of the signal (e.g., FM band frequencies). For that reason, the antenna may be connected to a variable tuning element (e.g., a varactor) and is periodically retuned, such as for each scheduled message reception, based on a time schedule, or the like.

The antenna connects to, and is controlled by, the transceiver 209. Transactions between the MCU 211 and the radio components are mediated over the MCU-digital transceiver interface. The components of the watch are housed in a watch-sized enclosure and rely on battery power for operation.

In one embodiment, the MCU 211 includes a 32-bit general purpose CPU, RAM and Flash memory, an LCD display, and user-interface hardware including but not limited to buttons and a rotating bezel. Also included are power and clock circuits. The MCU's function is to control the functionality above OSI level 2, including running operating system, application, presentation, connection and data selection activities, as well as to drive the user I/O devices at the physical level. It interfaces to the rest of the watch through the transceiver 209.

The transceiver 209 generally includes two components, a digital signal processor (DSP) 221 which performs control, scheduling and post-processing tasks for the transceiver, and a real time device (RTD) 223, which includes a digital radio, and performs the functions of system timing, and real-time event dispatching. In one embodiment, the RTD 223 may be a field-programmable gate array (FPGA) plus a discrete analog radio 207. In an alternate embodiment, the functionality of the RTD is distributed between the DSP 221 and the MCU 211, negating the need for a separate RTD device. Alternatively, the DSP may be a DSP core plus sufficient RAM to accomplish required tasks, and may be embedded into a single device with the MCU and its memory and peripherals. The DSP function may also be realized through appropriate CPU instructions given a suitable CPU such as the ARM7 processor family.

The DSP 221 is connected to the MCU 211, and transceiver tasks are commanded by the MCU 211. Since the MCU 211 may not be aware of the actual timing of events on the subcarrier link, substantial interpretation of its commands by the DSP 221 may be necessary. In other words, the MCU 211 may be instructed (through user interaction or control) to retrieve selected data that is known to be broadcast over the communications network. The MCU 211 is configured to resolve the identified and selected data into particular packet numbers or identifiers, such as through the use of a lookup table or similar function. The MCU 211 passes this information to the DSP 221, which in turn resolves the particular packet numbers or identifiers into actual timing upon which to schedule the receiver to begin receiving.

One of the DSP's main tasks is to process data that is received in either the broadcast mode or in the local mode. This processing includes subcarrier phase recovery, baud recovery and/or tracking, compensation for fading effects, demodulation, deinterleaving, channel state estimation and soft-decision convolutional (Viterbi) error-correction. The post-processing of packets occurs when the entire packet has been received. While this occurs immediately after capture in the local mode instance, subcarrier packets are captured in time-separated segments, nominally over the course of a frame. These captured segments are stored in the DSP 221 memory.

Among the DSP 221 control tasks is the translation of requested subcarrier packet numbers to the exact set of broadcast segments that comprise the packet, scheduling the reception of each segment, interleaving this scheduling with other segments from other requested packets, and forming the low-level commands to the RTD 223 to accomplish these tasks. It also tracks each active broadcast station's timing with respect to the RTD's local clock to adjust for clock drift and frame offset among the various stations. The DSP 221 is also responsible for probing and acquiring timing for each actual and potential broadcast station, as requested by the MCU 211.

The tasks of the RTD 223 are two-fold. Its digital section contains system timebases, including the crystal oscillator that provides the system clock to the MCU 211 and DSP 221. The timebase also provides baud and sample timing for transmit and receive operations, start/stop control for radio operation, and controls the periods of clock suspension to the MCU 211 and DSP 221. The other task, is, of course, radio operation.

RTD 223 radio operation includes both subcarrier and local mode reception, and local mode transmission. These tasks use substantial numbers of common elements. The radio 207 receives either subcarrier segments or local mode packets, storing the received, filtered, baseband-converted A-to-D samples in a local RAM. When transmitting in the local mode, this RAM is filled with pre-computed transmit samples by the DSP 221, and these are then used by the RTD 223 to generate the FSK signal for local mode transmission.

The clock to the MCU 211 and DSP 221 is automatically halted during data capture, and restarted immediately thereafter. A warning interrupt is sent to the MCU 211 when the warm-up event triggers, roughly 1 mS prior to capture.

Mobile Device/Watch Receiver Operation

In the subcarrier broadcast mode, the watch transceiver 209 is in a receive-only mode. When commanded by the MCU to receive a broadcast packet, the DSP refers to its tracking information on the station indicated. If no information is present on this station, the receive request is aborted and an error is returned to the MCU. Using this information, the DSP determines the expected arrival times of the 16 segments that comprise the packet. A list of segment receive commands is generated and stored in the DSP memory.

The DSP's dispatch function monitors the list of pending receive segments, which may include segments for several pending packet requests. As the time for a given segment capture approaches, the dispatch function passes a series of commands to the RTD. These commands include the frequency, antenna tuning parameters, duration of capture, and start time. The DSP may enter a sleep state at this time. The RTD's hardware time comparator then triggers each command in sequence. Typically, these commands are "warm-up", "capture" and "stop." As the warm-up command is issued, the MCU is simultaneously notified that the clock is going to be stopped. The warm-up process takes roughly 1 mS. When the capture command executes, the clock stops, and resumes when the capture ends with the stop command.

The DSP is interrupted on command completion, and immediately retrieves the captured data. This may include data from several segments if there were contiguous segments requested. The segment data is then stored as a set of signal samples. This requires 4 bytes per source bit of data, plus overhead, or about 300 bytes per segment. Since, in one implementation, the RTD has 2560 bytes of internal storage, this would limit consecutive segment reception to 8 segments. This is less of a limitation that it first appears, since a hashing function separates logical packets (and hence, logical segments) from neighboring ones prior to transmission. Thus, packets are only consecutive by chance, not because they are related in content.

When the last segment of a packet is received, the DSP collects the received segments and begins post-processing the data, which is retrieved as a set of received signal samples. The general flow of operation is this: Timing Recovery, Data Demodulation, and Convolutional Decoding (Error Correction) (with a Viterbi algorithm, in one embodiment). This process may take several milliseconds per packet. The resulting data packet is then placed in a receive block in the DSP memory, along with the receive status information, and the MCU is notified that a new packet is available.

Transmitting in Broadcast Mode

Figure 11:
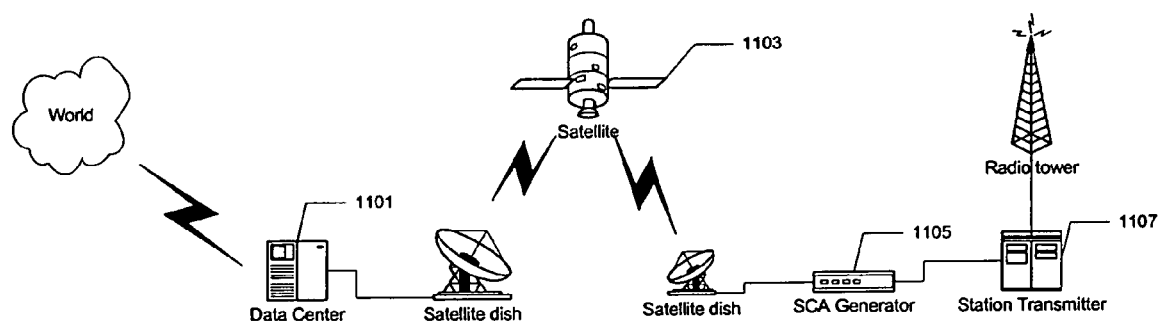
FIG. 11 presents an overview of the subject communication system in a typical context.

In the disclosed embodiment, broadcast data is divided at the data transmission network center (See FIG. 11, 1101) into two groups: normal-latency data or "normal frame data," and "fast frame data." The data center passes the frame data to the broadcast generator by satellite or similar means, synchronously with the broadcast frame rate. The data may be passed in blocks. For instance, normal frame data may be sent, followed by a fast frame section. Later, as shown on FIG. 5 and FIG. 7, a next fast frame section is sent, followed by any subsequent fast frame sections. This process is repeated in each frame.

Figure 3:
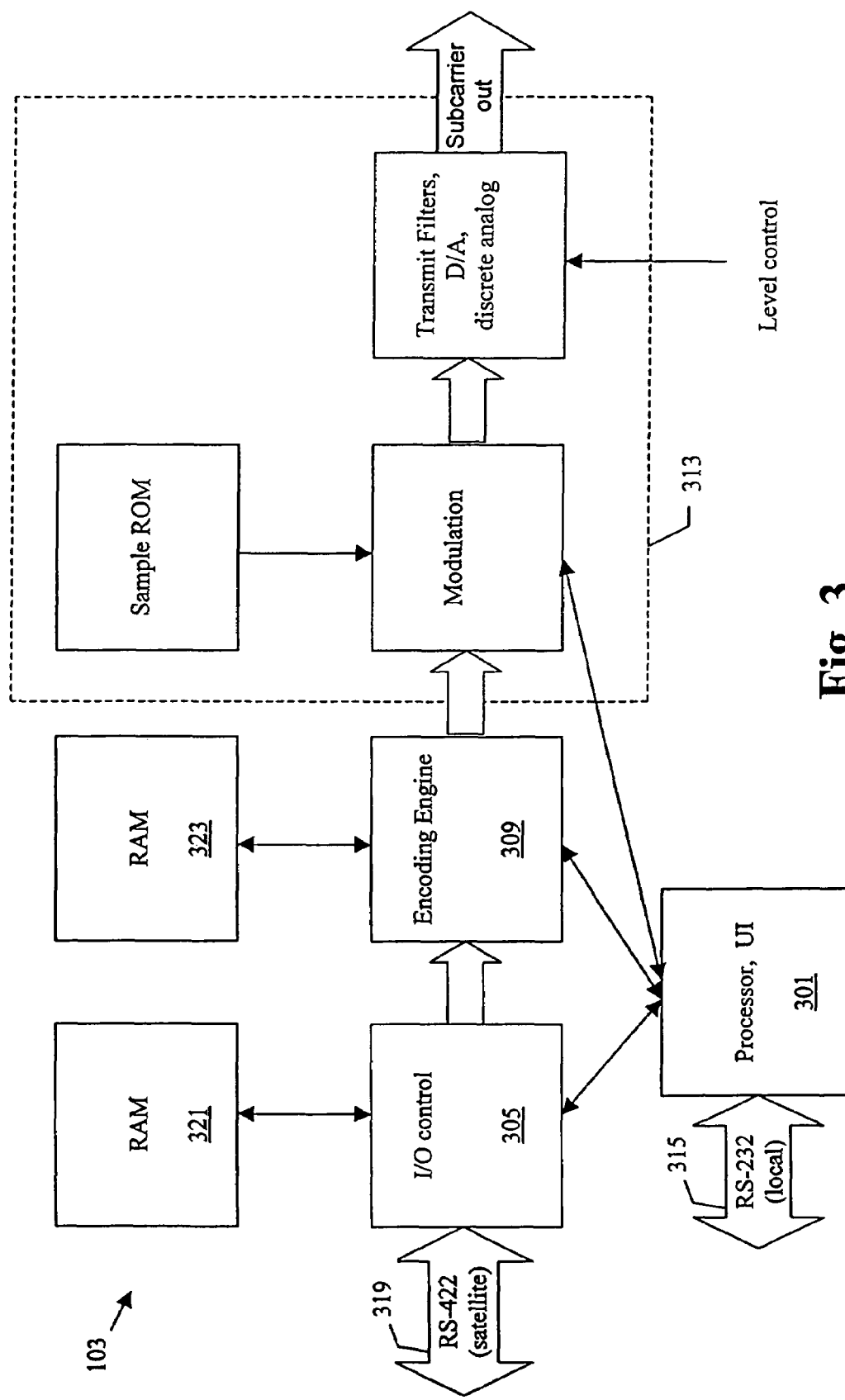
FIG. 3 is a functional block diagram of a broadcast transmitter or station generator component of a communications system implementing the present invention.

Considering broadcast mode in more depth, FIG. 3 shows an illustrative broadcast transmitter 103 (also referred to as the "station generator" or simply the "generator"). The broadcast transmitter 103 is the subcarrier channel transmitting device, and resides at a transmitting FM station. It receives formatted data via satellite or other dedicated high-speed circuit, encodes the data for transmission, converts the encoded data to FM subcarrier baseband signals, and passes this waveform to the radio station's broadcast equipment.

Figure 5:
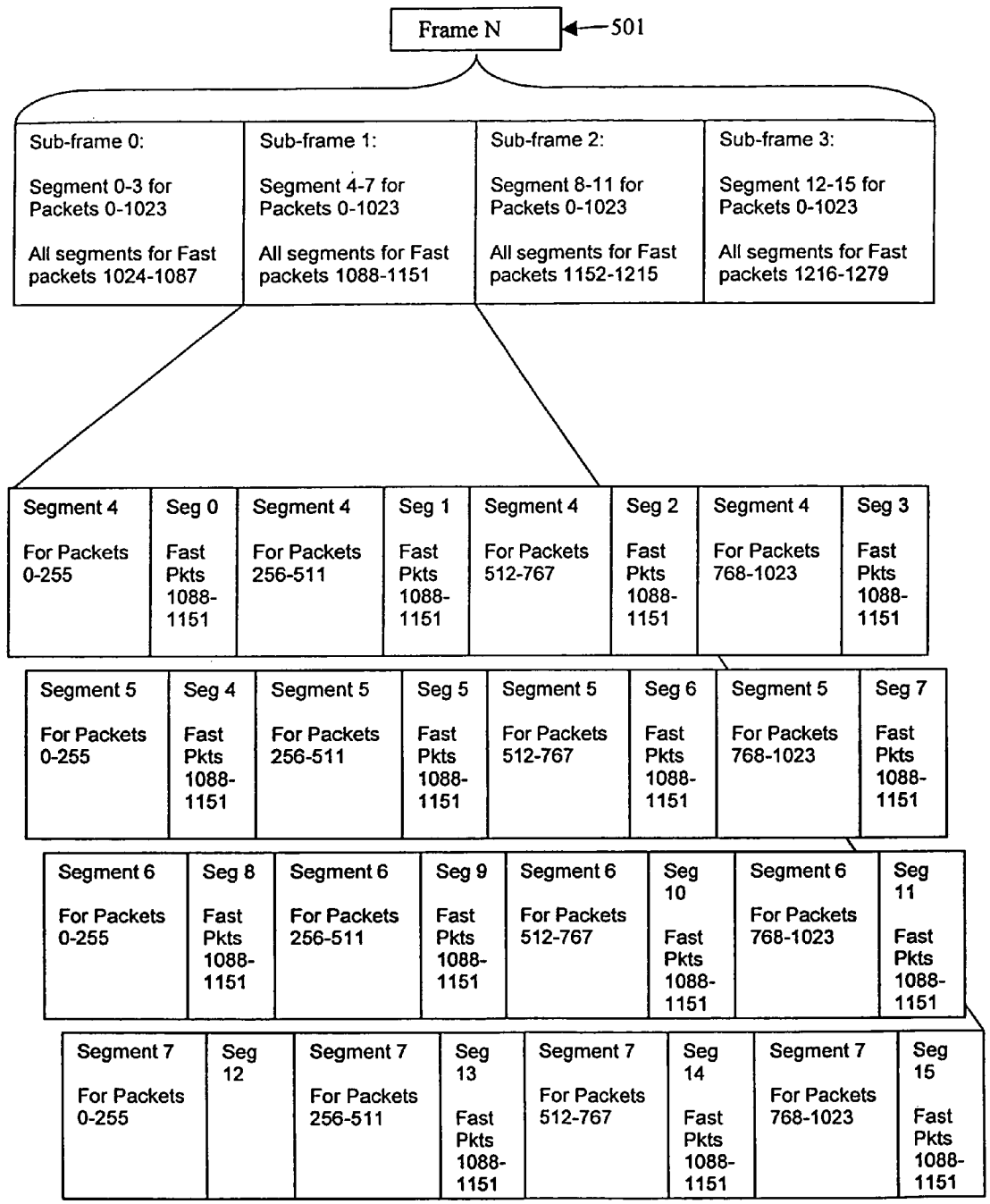
FIGS. 5-9 are graphical representations of a data construct or format for transmissions by a communications system implementing the present invention.
Figure 6:
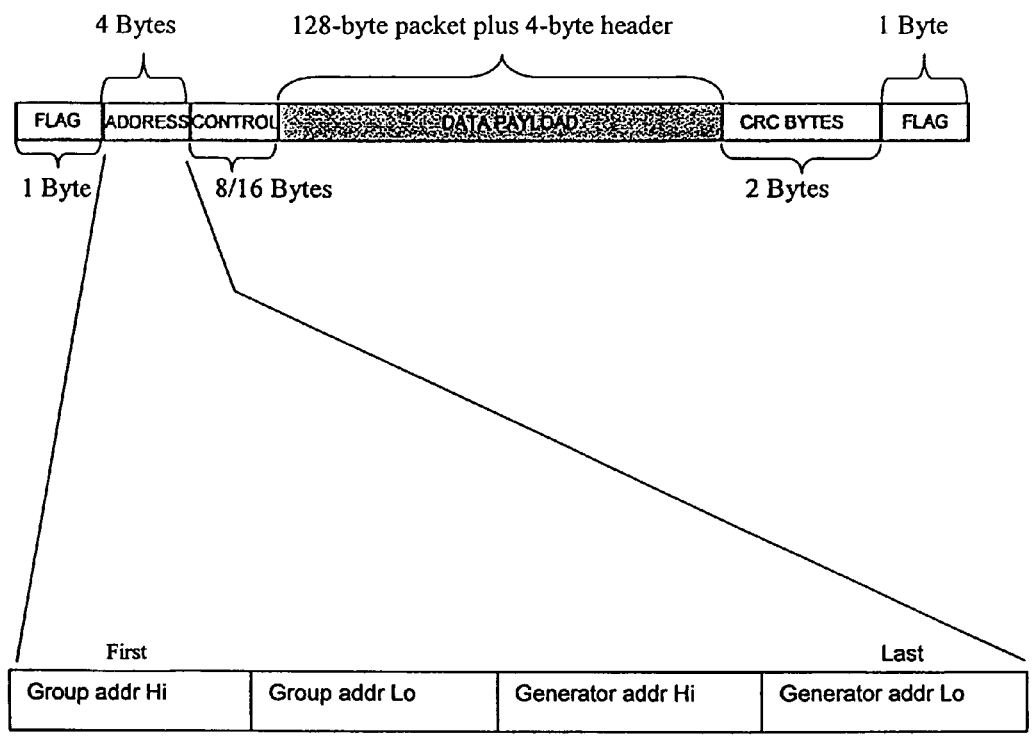

The broadcast transmitter 103, at any given time, has two data arrays that it manages. One is the output FM subcarrier frame image 501 (see in FIG. 5 and as described below), which is passed to a hardware modulator function byte-by-byte according to the output baud clock. The other data array is the satellite input buffer, which is filled by the data payload of HDLC blocks that come from the satellite link interface 319. This interface may be implemented with any number of conventional protocols, such as, but not limited to RS-422, RS-232, USB, IEEE-1394, or Ethernet interfaces. A depiction of an HDLC frame is shown in FIG. 6. Those skilled in the art will recognize HDLC as a High-Level Data Link Control—a standardized, bit oriented, switched and non-switched protocol. One description of HDLC may be found in at least ISO standards ISO 3309 and ISO 4335. As shown on a high-level diagram in FIG. 11, the data flows from a data center 1101 (the "head-end") via satellite 1103 to each broadcast transmitter 1107. This data is sent in HDLC blocks according to a set of HDLC point-to-multipoint procedures. These blocks have data payloads corresponding to individual subcarrier packets. The generator 1105 accepts only blocks addressed for it, or for some group of which it is a member. The generator then places the data from these blocks into the frame it is currently building. In one embodiment, the HDLC format is modified to create a 4 byte address field where addresses are assigned in a hierarchical manner. This way, successively smaller groups can be selected by placing wildcard values such as 0xff or 0xfe in the lower ordered bytes, advantageously reducing satellite bandwidth so that only one channel is necessary to handle all station generators.

Due to the nature of the subcarrier frame ECC encoding, input data destined for a given output frame should be available several seconds before the transmission of the subcarrier frame begins. One exception is the "fast packet" data, which need only precede the quarter-frame in which it resides.

Returning to FIG. 3, the broadcast transmitter 103 generally includes the following elements: a control processor 301, a precision time base, a serial I/O controller 305, an encoding engine 309, and a subcarrier signal generator 313. Those of skill in the art will appreciate that the control processor (301) may be implemented by utilizing a conventional processing device such as, but not limited to a microprocessor, microcontroller, programmable logic array, programmable gate array, or an ASIC.

The control processor 301 maintains system status, accepts periodic commands and control information from the uplink, makes period reports, calculates and adjusts the local time base to account for timing drift with respect to the uplink host, and controls operational modes with the broadcast transmitter. It also provides a direct RS-232 (DCE) control port 315 for local command and set-up. The control port 315 may also be implemented with any number of conventional protocols, such as, but not limited to RS-422, USB, or Ethernet interfaces.

The precision time base of the signal generator includes a 1-ppm oscillator, which can be trimmed to track the master time-base at the uplink host, with a resolution of 0.01 ppm. Nominally on the hour, each generator will be informed of the correct current time to an accuracy of roughly 100 microseconds, adjusted for transmission delay. The transmission delay may be based upon a known, fixed path (preferred), or may be calculated from a NTh protocol handshake.

The serial I/O controller 305 communicates with the uplink device (likely a satellite transceiver) via communications interface, e.g., an RS-422 serial interface 319. The data format may be HDLC. An SRAM 321 is attached to the serial I/O controller 305 for input buffering.

The encoding engine 309 takes the frames received from the uplink, hashes and places the packets physically within the frame, processes them through the encoding and time-diversity stages, and produces an output image for transmission. This component may be an FPGA. An SRAM 323 is attached to the encoding engine 309 for working storage.

The subcarrier signal generator 313 provides the subcarrier modulator, transmit filter, and amplification functions. It draws from the encoding engine's output data image at the baud rate. The subcarrier signal generator 313 may be implemented in an FPGA, a large sample ROM, and a subcarrier signal generator that comprises, in one embodiment, a digital-analog converter and an analog output filter.

Figure 12:
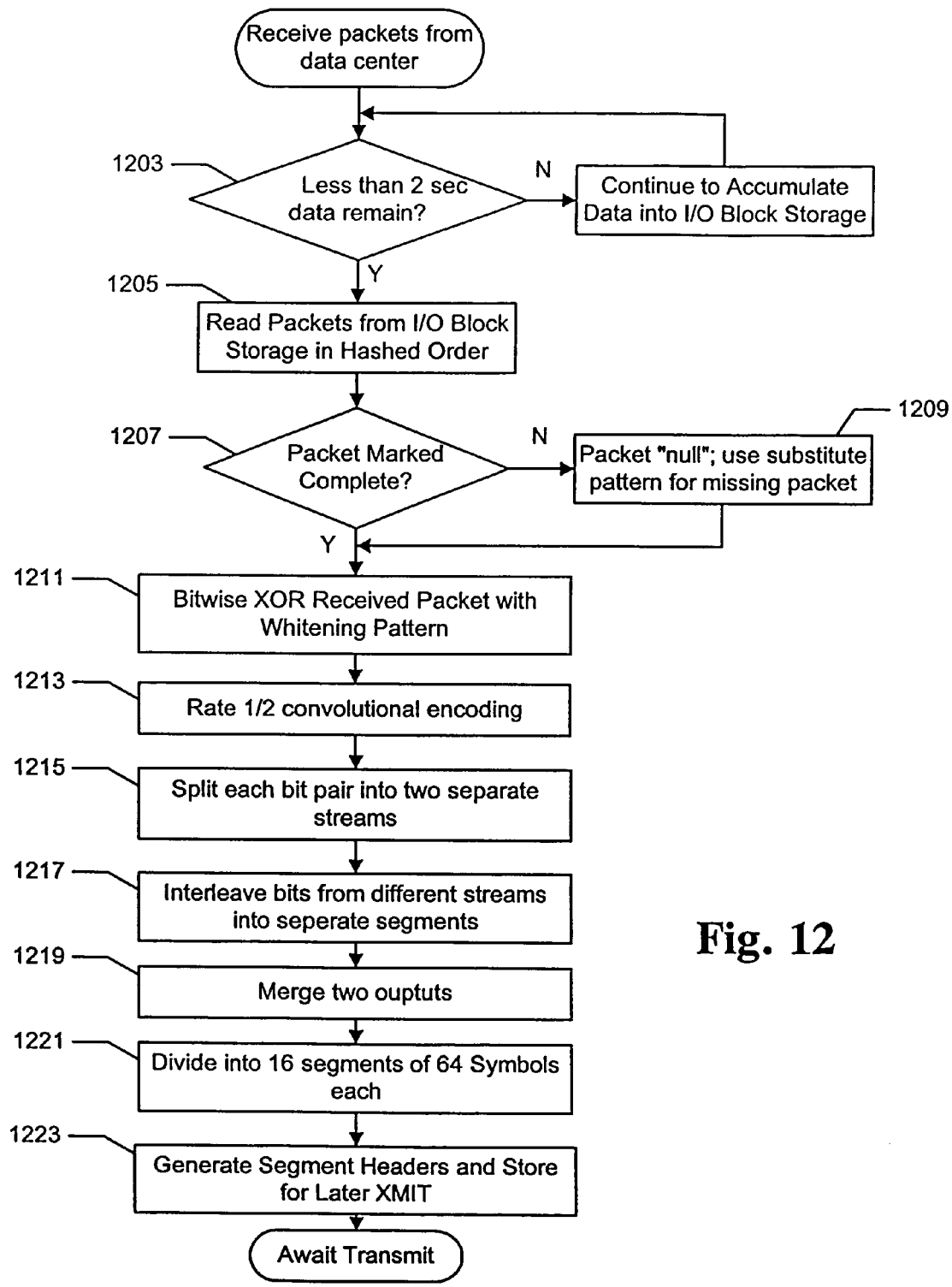
FIG. 12 is a flow chart depicting one approach to encoding a data stream for transmission.

Turning to FIG. 12, in one embodiment, frame encoding is triggered 1203 by the data remaining in the current output quarter-frame decreasing past a certain threshold. In one example, this threshold occurs 4 times per frame, prior to the start of transmission of the next quarter-frame (containing one fourth of the normal frame and all of the next "fast frame" data). The threshold event for one embodiment is 2 seconds of data remaining in the current section. All encoding engine processing must occur during this period. The initial condition at startup for the output timing is receipt of the frame-done message from the head-end.

The generator interleaves, (or, equivalently "hashes"), packets to prevent significant amounts of related information from arriving at the mobile device receiver in sequential "on-air" packets. This may be necessary, in some embodiments, because receiver hardware may have limitations for sequential packet reception. It is presumed that the data is presented to the generator in sequential packets. Logical packet order is recreated at the mobile device receiver output; therefore, this hashing process is transparent to the data center and watch. Upon commencement of encoding, the encoding engine reads packets from the I/O block's storage SRAM in the hashed packet order 1205. Access to the I/O block SRAM is shared with the I/O block on a time-slice basis. Packets not marked as complete in the I/O block SRAM, when read, 1207 are considered empty or null and an alternate pattern may be substituted 1209.

Figure 10:
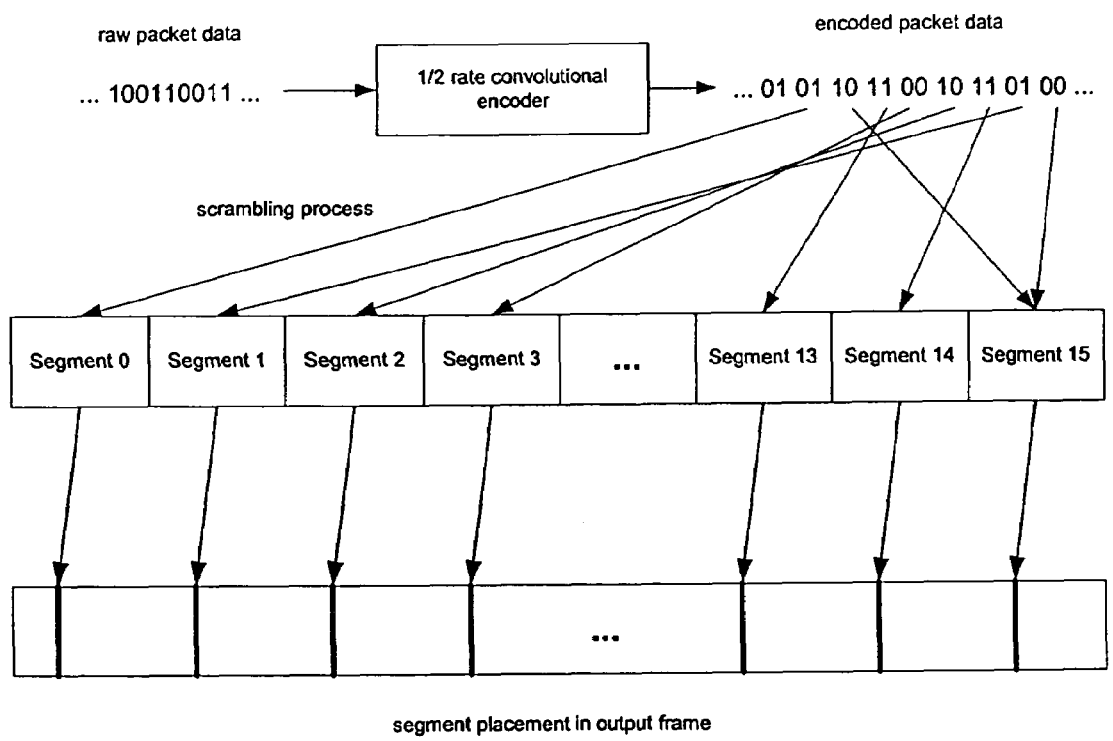
FIG. 10 is a graphical representation of data transmissions being scattered in time for transmission in accordance with one implementation of the present invention.

As each packet is read in its interleaved order, it is passed through a data whitener, which performs an exclusive-OR 1211 between the data and a whitening pattern. The whitening pattern, in one embodiment, may be a function of a table and the packet number of the packet being processed. The whitened data is then passed 1213 to the convolutional encoder. In one implementation, a ½-rate, constraint-length-9, tail-biting, convolutional encoder may be used. An encoder of this type produces 2 output bits for each input bit, and spreads the information content of each input bit across several subsequent output bit-pairs, with the last input bits coupled to the first input bits in a tail-biting fashion. The output of the encoder, consisting of a pair of bits for each input bit, is then passed as two streams to two separate bit-interleave modules 1215. The bit-interleave modules use the packet number and the bit index to place 1217 the encoded bit streams into segments in the output frame image SRAM. In one implementation, the bit-interleavers are simple modular adders that transpose one bit position to another, and are configured so that as few related encoder-output bits as possible reside in the same output segment. One method is to rotate the encoder bits linearly through the 16 segments, so that the 17th bit out the encoder will be the second bit into the first segment, and the 18th bit out will be the second bit into the second segment, and so forth. This process is also illustrated in FIG. 10.

The two output streams are then joined 1219, with one bit from each stream providing the two bits of each output symbol. The 2048 symbols created this way are then divided into 16 segments of 64 symbols each (See 1221 on FIG. 12). The segment headers are generated 1223, which allows the receiving mobile device to quickly identify the segment boundaries and locate the placement within the current frame. This scattering and distribution provides fading protection through time diversity. The receiver is capable of reconstructing whole messages despite one or more segments being seriously impaired or even missing, given minimal impairment to the remaining segments. This fading protection is lessened for fast frame packets, but the separation is still good at a few seconds between segments. The redundant convolutional encoding also provides considerable Gaussian noise protection in the absence of significant fading. Since the Viterbi algorithm can fail in extremely noisy or faded circumstances, in one embodiment, a CRC-16 error check could be used in the application data.

Modulation of the data is performed symbol by symbol under transmit clock timing. This requires that frame data sections be ready for transmission prior to the time that the first symbol of the relevant section is required by the modulator. The first fast frame and the normal data frame data must be ready at the beginning of the frame 501 (FIG. 5). Subsequent fast frames must be processed and inserted prior to the time that their quartile of the frame enters the modulator (as shown at 313, FIG. 3). Once the initial frame (containing the normal frame and first fast frame) has been constructed, it is available to the modulator for transmission. In one embodiment, the broadcast mode uses an FM subcarrier centered at 67,647 Hz within the FM baseband, and the data is modulated using QPSK.

Figure 4:
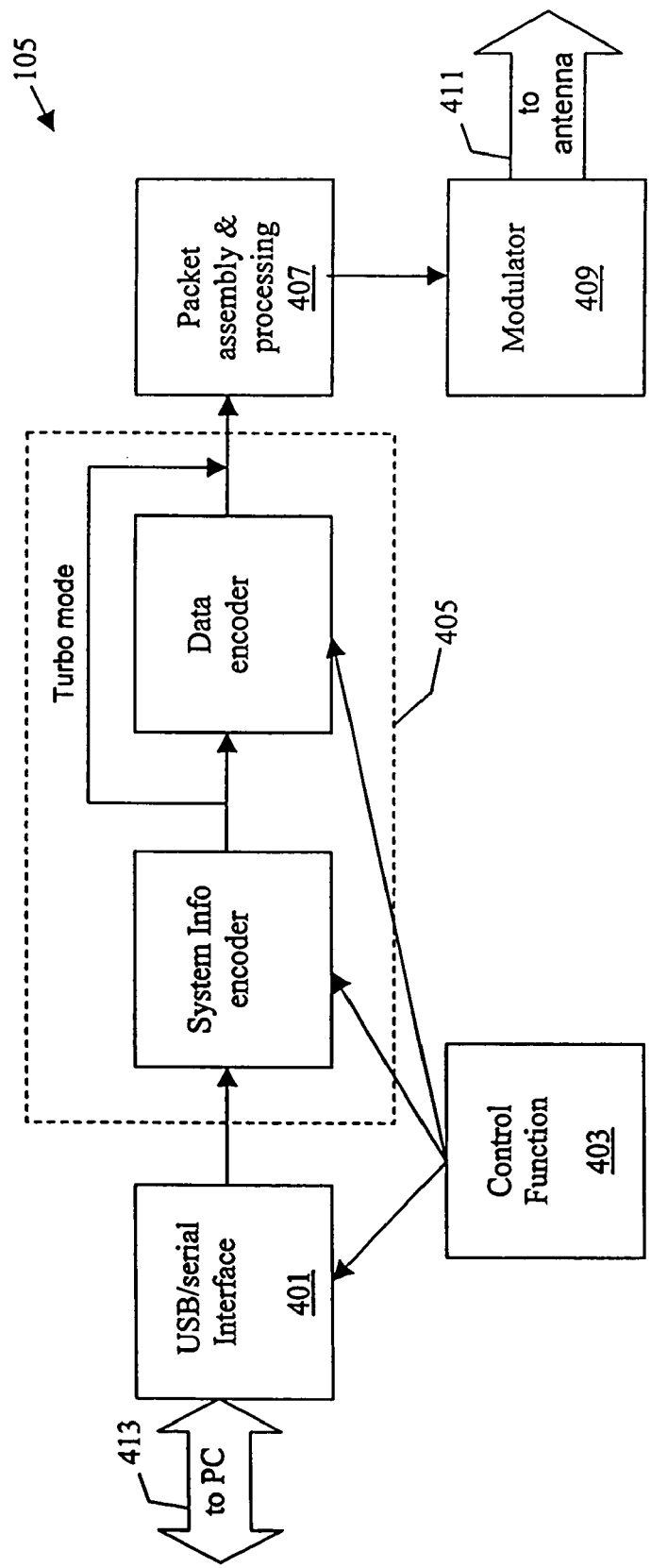
FIG. 4 is a functional block diagram of a localcast transmitter component of a communications system implementing the present invention.

Turning now to FIG. 4, an illustrative localcast transmitter 105 is shown. The localcast transmitter 105 uses a locally-unused FM frequency to broadcast data locally to mobile devices 101 (FIG. 1). The localcast transmitter operates under FCC Part 15 regulations allowing low-power local use of the normal audio portion of an FM broadcast channel. In this embodiment, the localcast transmitter is used to transmit a signal over an area approximately 15 meters. The localcast transmitter connects to a PC or other data source via a communications interface 413, such as a Universal Serial Bus (USB) or RS-232 serial, encodes the data for transmission, and transmits the encoded data directly via an embedded FM transmitter and antenna assembly. The localcast transmitter may be enclosed in a small plastic case.

Two different implementations of the localcaster may be realized. In one, the localcast transmitter provides a local, one-way, data broadcast to one or more nearby mobile devices. This broadcast can either replicate one or two on-air channels, provide one or two local-content channels, or a combination of the two. When operating in these modes, the data format and speed is identical to that on the on-air channels. The speed may be configured to be higher in a special application mode, depending on the desired range.

The second localcaster implementation provides a local 2-way data communication ability, which provides for the above-described 1-way mode of broadcast as well as an application mode by which data may be transmitted from the localcaster to the watch or mobile device, and also from the device to the localcaster. This mode, also called broadcast simulation mode, provides for the application-specific determination of two-way data traffic based on traditional handshaking techniques.

In one embodiment, as described more fully below, the localcast transmitter includes a USB interface to a PC or similar device, a control function, two encoders, a packet assembler, an FCC Part 15 direct FM modulator, and an antenna. With the exception of the antenna and a discrete analog filter, these components may be implemented in a monolithic standard-cell ASIC. Accordingly, in one embodiment, the localcast transmitter may be comprised of circuit elements such as an ASIC, filter network, crystal, and antenna, and one or more connectors.

The interface 401 connects the localcast transmitter to its data source. The interface 401 may be implemented with any number of standard interface protocols, such as, but not limited to USB, RS-232, or IEEE-1394. In one embodiment, this is implemented as an IP block which is combined into a localcaster IC. The data source transmits packets of data over this link. In one embodiment, these packets contain 64 bytes of data, and in alternate embodiments, the packets transferred may be 68 or 132 bytes long, including 4 bytes of header information. The exact formatting of this link depends upon the IP characteristics.

The control function 403 collects the transmit data packets from the data source, and performs handshaking. It sets the desired transmission frequency, mode and signal power.

The encoding function 405 (which includes a system information encoder and an optional data encoder) formats the data for transmission as baseband (audio) samples. It has a convolutional encoder for the system information block, and an optional convolutional encoder for the packet data. Upon collecting the packet from the USB, the localcast transmitter 105 processes it via a data encoder. The packet data portion of this encoder is identical to the data encoder in the subcarrier generator 103, except that data whitening uses a fixed pattern, unrelated to the packet number. This process generates 128 bytes of encoded data from the 64 bytes of raw input data. In the case of the "turbo" or high-speed, short distance mode, this encoding is bypassed as shown in encoding function 405, and 128 unencoded bytes are passed directly to the modulator function.

The processing logic 407 adds correlation information for synchronization (described below), and in one embodiment, interleaves the encoded system information and data into segments to protect against noise. The resulting bit stream is then converted to baseband audio samples and the result passed to the modulator.

The direct FM modulator 409 takes the audio samples provided by the processing section and generates the FM frequency output. The antenna 411 for the localcast transmitter or transceiver can either be a loop or a dipole, depending upon the form factor required.

A special case arises in broadcast simulation mode. First, the localcast data payload must be adjusted to match the payload size of broadcast packets. In one embodiment, the localcast 64 byte-payload must be adjusted to match the 128 byte broadcast packet size. This is done by splitting broadcast packets into two localcast packets prior to transmission, and reassembling the packets in the transceiver firmware. Second, broadcast packet numbers are associated with the local mode packets by encoding them into the localcast header. These packet numbers are used by the transceiver firmware to allow the mobile devices' microprocessor to retrieve locally broadcast packets transparently to higher-level software.

Data Transmission Format

What follows is a discussion, in conjunction with FIGS. 5-9, of a particular data format for communications transmitted by one embodiment of the present invention. The disclosed embodiment is but one format, and alternatives will become readily apparent from the teachings of the present invention to those skilled in the art.

Data is transmitted and received in the communication system on two types of channel: A broadcast channel (i.e., in broadcast mode) (See FIG. 1, 109) and a local channel (i.e., in localcast mode) (See FIG. 1, 111). A peer-to-peer mode (See FIG. 1, 117) is discussed below. The data on these channels are referred to as streams. The two channels have different on-air formats, and may contain differing data, and have similar structures in one embodiment, and different structures in an alternate embodiment.

A flame is the basic partition in a data stream. One sample frame format 501 is shown in FIG. 5. Successive flames are numbered sequentially. This enumeration may be reset daily, with the first frame starting after midnight being Frame Zero. In the broadcast stream, a frame is of fixed length of approximately 113 seconds (1.88 minutes). In the localcast stream, a frame is of variable length, depending upon the local message content.

A packet is the smallest retrievable unit in a flame, including, in one embodiment, 64 bytes of information. In this application there are preferably 2560 packets in each broadcast flame. In another embodiment, 128 bytes of information may be used in a packet, and each packet broadcast flame will contain 1280 packets. Certain of the packets in a flame may be designated as fast packets. These packets are processed and transmitted with less latency than normal packets. In one described implementation, there are 512 fast packets and 2048 normal packets in each broadcast flame. In this embodiment, packets 0-2047 are "normal packets," and packets 2048-2559 are "fast" packets. In an alternate implementation, there are 256 fast packets and 1024 normal packets in each broadcast flame, with packets 0-1023 being "normal packets" and packets 1024-1280 being "fast packets." Packet 0 is a system packet and contains the frame number, time, and other housekeeping information, such as roaming local channel frequencies. Local channel packets may contain a header of 20 bytes to allow local data to be transferred without pre-arrangement, as well as to allow variable sizing of Local frames.

Figure 7:
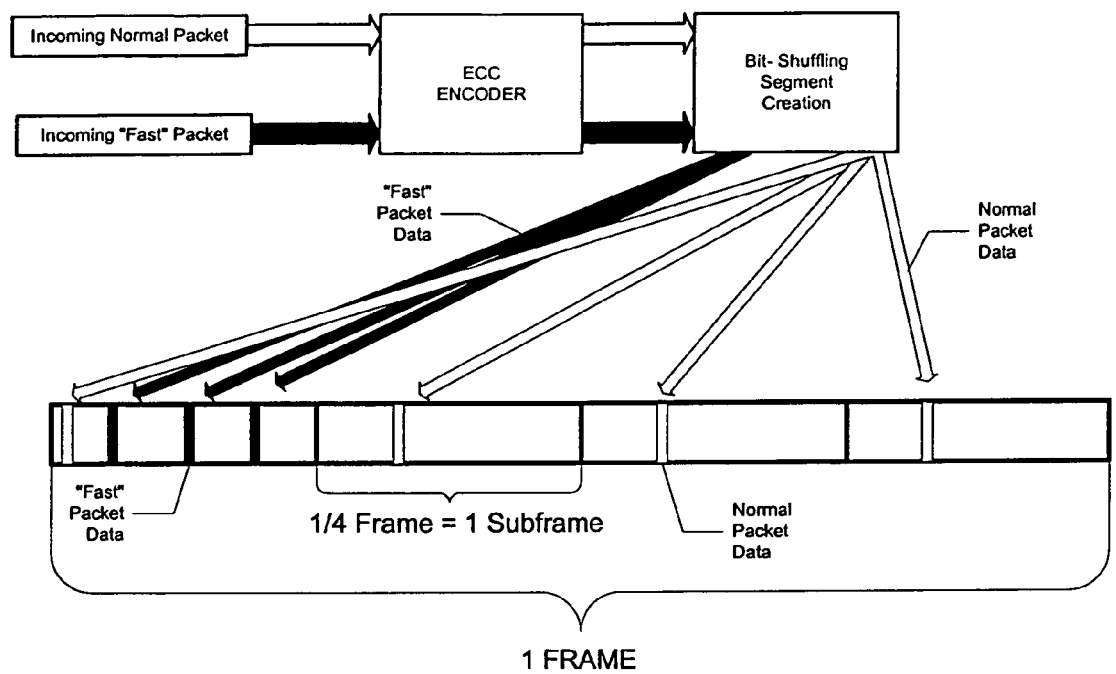
Figure 8:
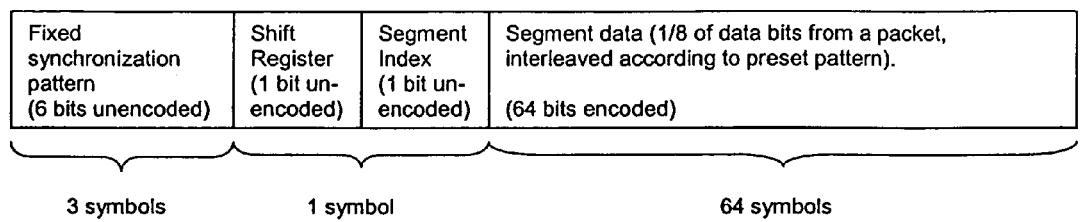
Figure 9:
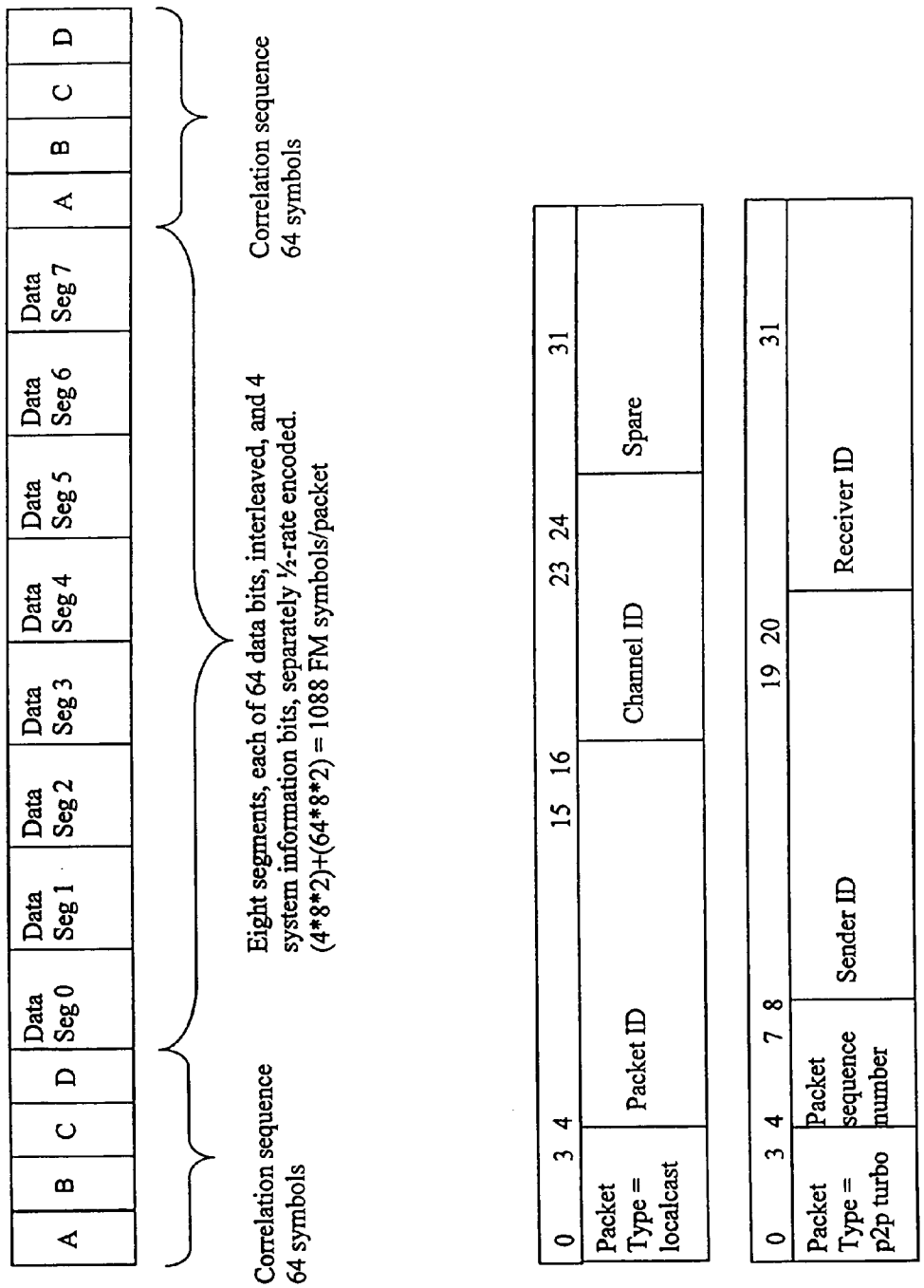

In the Broadcast stream, packets are comprised of 8 segments at the physical level. As shown in FIG. 7, the segments in the broadcast stream are distributed across the frame, for fading protection, via time diversity. As shown in FIG. 8, each segment contains 64 data bits (128 bits in an alternate embodiment), along with synchronization information for the DSP process. These segments are reassembled by the receiver hardware, and presented to the network level as packets, shortly after the last segment is received. Segments are transparent at the logical level, and are not individually retrievable. Normally, the 16 segments comprising a packet (8 segments in an alternate embodiment) are distributed across the entire frame, with the completed packet not being available until the last segment (near the end of the frame) is received. In the case of "fast packets", the 8 or 16 segments are all located within a quarter of the frame (sometimes called a "sub-frame"). This allows the packet to be reassembled in one-fourth of the normal time and hence allows transmission latency in the case of fast packets to be reduced fourfold. However, the error rate of fast packets, due to fading, is increased. Unlike the broadcast stream, packets are not distributed in the localcast stream. See FIG. 9 for an illustrative localcast packet format.

In one embodiment, a physical frame may be composed of 20,480 (8*2560) segments. Each segment is composed of partial data from one of the 2560 packets, and a 4 symbol header. At the physical level, packet data is encoded so that one symbol represents one bit (with redundancy), and these symbols are then distributed among 8 segments, which are separated in time. The segments that make up normal packets are distributed evenly throughout the frame. Segments for fast packets are distributed evenly through a quarter of a frame, also known as a sub-frame. For the purposes of timing recovery and synchronization, each segment has a header of four raw (unencoded) symbols so that each symbol represents 2 bits (see FIG. 8). The first 3 symbols of this header are a fixed pattern, which marks the start of a segment. This is used for timing recovery. The next bit is one bit of a 15-bit linear feedback shift register pattern (padded to 16 bits), which spans 16 segment headers. When performing initial lock-up, the receiver scans incoming segment data until the accumulated LFSR bits indicate a correlation. In one embodiment, this may occur once every 16 segments, for a nominal scan time of 24 segments. When correlation occurs, the 16 Segment Index bits, which have also been accumulated, indicate the current segment number (divided by 16). The segment index may be protected with a Gray code, a Hamming code and parity, so that the segment index can be used with a high degree of confidence.

Operating Modes

As previously mentioned, and shown on FIG. 1 the disclosed communication system has three main operating modes. These are the subcarrier broadcast mode ("broadcast") 109, the localcast mode ("localcast") 111, and the Peer-to-Peer mode 117. The latter two modes employ directly modulated main channel FM signaling over a local link, while the former mode employs wide-area FM subcarrier broadcasting within the geographic service area of one or more commercial FM stations. The following discussion details and contrasts each of these operating modes.

Broadcast Mode

The broadcast mode involves the simplex transfer of information from one or more broadcast transmitters to one or more watches. FM subcarrier modulation is employed to transmit the information over commercial FM stations. The watches 101, 121 receive this FM subcarrier signal via an antenna embedded in the watchband, demodulate and parse the received data and pass the information to the controlling MCU.

Localcast and Peer-to-Peer Modes

The local mode is divided into two modes, a localcast mode and a peer-to-peer mode. The modes share a common transmission format. Direct FM modulation is employed to transmit the information over locally-unused FM frequencies. The watches receive and transmit this FM signal via an antenna embedded in the watchband, demodulate and parse the received data and pass the information to the MCU.

The Localcast (or local broadcast) mode represents either a 1 or 2-way transmission from the localcast transmitter attached to a PC or other high-level controller, to a watch or mobile device. The area over which the local broadcast is transmitted is small as compared to the broadcast mode transmissions. Data transmitted in the localcast mode may be either a local replication of broadcast mode data, or local content in the same format, or application data sent via special application-layer protocols. The Peer-to-Peer mode is an inherently bi-directional, half-duplex link in which the channel switches (or "ping-pongs") between two participating watches.

In one embodiment of both localcast and peer-peer modes, the local data mode communicates in packets using direct FSK modulation. This uses the same ½-rate convolutional encoding as the main channel. Localcast communication is half-duplex, and uses a shared FM station frequency. In any given metropolitan area, a subset of the FM broadcast frequencies will be unused and therefore available for FCC Part 15 communication. A list of these frequencies might be disseminated in the broadcast mode or even in localcast mode from a PC-connected localcaster. In any event, the MCU provides the transceiver with the selected station frequencies. Note that some local channel operations preclude main channel operations. Conflicts between local and broadcast operation are resolved in favor of the local mode task.

Unlike the broadcast mode, packets in the local mode are 64 bytes, not 128—this is partially due to FCC Part 15 cycle timing, and partially due to the desire to keep packet cycle times short enough to allow real-time duplex applications, such as speech.

Watch Receiver Operation

Typically, upon MCU command, the transceiver tests an MCU-selected station for main channel signal (and the cadence of that signal), and for the presence of a subcarrier signal. The first part of local discovery is to use a provided station list to scan the FM band and categorize the available frequencies according to observed usage. To do this, received signal strength (RSSI) is filtered and digitized with a bandwidth of perhaps one kilohertz. Possible results include an active FM station, a local channel transmission, or an empty channel. The watch will be capable of storing tracking information on all frequencies available to it, simultaneously. An active FM station would appear ideally as an unvarying signal, or with significant multipath, as a varying RSSI uncorrelated with our localcast format. If an appropriate subcarrier signal is detectable on the station, this will also be reported. A local channel transmission would appear as a particularly steady RSSI, serrated with a much lower RSSI corresponding to the inter-packet power-off intervals of the localcast format. The transceiver will report information on the cadence found, but final decisions about type of transmission should be done at the data level by the MCU. Finally, an empty channel would have continuously low RSSI.

Note that the RSSI detection can occur with signals much too weak to reliably demodulate, and will also allow rapid analysis of the FM spectrum for local operation. This allows detection of watches engaged in communication, where one of them is outside of normal range. The RSSI analysis also yields the approximate cycle timing of the received exchanges. Thus, RSSI temporal analysis will yield a list of active and/or empty localcast channels. This result will be reported back to the MCU for further commands.

Upon command from the MCU, the transceiver begins beaconing or acquires one of the active channels. In the latter case, the transceiver captures a packet from the FM channel. It then determines the precise timing of the selected localcast signal. This is done by receiving and analyzing the specially constructed correlation sequences, which provide both instantaneous symbol timing and an estimate of inter-device clock drift. Once timing information has been extracted, the transceiver captures the data in the following packet and reports this data to the MCU. Presumably, the contents of this packet are sufficient for the MCU to take subsequent action, which could be some sort of handshake reply, a command to begin retrieving data, a command to analyze another channel, or a command to send a beacon on an empty channel.

In a peer-to-peer connection, the initiator is treated as the clock master. The other participant slaves its transmit clock to the clock derived from the received data. This allows the beaconing peer to immediately process the data in the first response packet, without a timing analysis phase.

After any necessary handshaking is completed, the MCU may command the transceiver to enter one of several communication modes, with transmit and receive packets being passed to and from the MCU. This mode continues until otherwise commanded. Loss of signal is reported to the MCU as a suddenly poor signal quality value. The MCU may end the communication mode at this or any other interpacket time.

Watch Transmitter Operation

Packets to be transmitted are stored by the MCU in the DSP's memory space in structures called transmit blocks. These blocks also contain control information, such as the FM frequency to use. Prior to transmission, the DSP prefilters the data and converts it to the transmit samples needed by the RTD. The localcast physical layer packet structure is also added at this time. In one implementation, the 512-bit localcast packet becomes 2304 bytes of signal samples when presented to the RTD.

The DSP controls the timing of transmission, according to information recovered when the local connection was established, and, in certain duplex cases, according to the timing of the last local data received.

In the localcast mode, the RTD records an entire cycle time of localcast data. The DSP then uses the associated RSSI information to locate the localcast packet samples. Using the correlation sequences in the beginning and end of each localcast packet, the fine timing of the other localcast device is determined, and this information stored. The MCU may now begin to receive or transmit on the acquired channel.

Although the preceding description describes various embodiments of the system, the invention is not limited to such embodiment, but rather covers all modifications, alternatives, and equivalents that fall within the spirit and scope of the following claims.

We claim:

1. A broadcast transmitter, comprising:
an input-output controller coupled to a wireless satellite input interface and coupled to a buffer memory;
a control processor coupled to said input-output controller and coupled to a local input interface;
a precision time base coupled to said control processor;
an encoding engine coupled to said input-output controller, said control processor, and to a first memory; wherein the encoding engine:
encodes a plurality of extracted data packets into a first portion of encoded data streams for transmission at a first latency and a second portion of encoded data streams for transmission at a second latency, wherein the second latency is lower than the first latency; and
interleaves the first and second portions of encoded data streams over a broadcast frame that includes sub frames, wherein: each sub frame includes data associated with the first portion and data associated with the second portion, interleaved together, and each of the extracted data packets associated with the first portion is interleaved across multiple subframes; and
a subcarrier signal generator, coupled to said encoding engine, said control processor, a second memory, and to a subcarrier output, wherein the subcarrier signal generator is configured to transmit a signal in response to a message scheduled to a mobile device.

2. The broadcast transmitter in claim 1, wherein the control processor includes at least one of a microprocessor, microcontroller, programmable logic array, programmable gate array, and an ASIC.

3. The broadcast transmitter in claim 1, wherein the input-output controller comprises a field-programmable gate array.

4. The broadcast transmitter in claim 1, wherein the wireless satellite input interface further comprises at least one of an RS-422 interface, an RS-232 interface, an IEEE-1394 interface, a USB interface, or an Ethernet interface.

5. The broadcast transmitter in claim 1, wherein the wireless local input interface further comprises at least one of an RS-232 interface an RS-422 interface, an RS-232 interface, an IEEE-1394 interface, a USB interface, or an Ethernet interface.

6. The broadcast transmitter in claim 1, wherein the precision time base is comprised of a 1-ppm oscillator.

7. The broadcast transmitter in claim 1, wherein the subcarrier signal generator is further comprised of a modulator, a digital-analog converter, and an output filter.

8. The broadcast transmitter in claim 7, wherein the modulator is further comprised of a field-programmable gate array.

9. A broadcast transmitter that is arranged to broadcast data to a mobile device that is configured to receive data in a broadcast mode and a localcast mode, comprising:
- means for receiving formatted data from a wireless satellite data source and a local data source coupled together through an input-output controller that is coupled to a processor;
- means for encoding the formatted data to generated encoded data for transmission;
- means for converting the encoded data to FM subcarrier baseband signals; wherein the encoding engine:
  - encodes a plurality of extracted data packets into a first portion of encoded data streams for transmission at a first latency and a second portion of encoded data streams for transmission at a second latency, wherein the second latency is lower than the first latency; and
  - interleaves the first and second portions of encoded data streams over a broadcast frame that includes sub frames, wherein: each sub frame includes data associated with the first portion and data associated with the second portion, interleaved together, and each of the extracted data packets associated with the first portion is interleaved across multiple subframes; and
- means for transmitting the FM subcarrier baseband signals to the mobile device in accordance with a predetermined schedule, such that the mobile device receives, at an antenna configured to be tuned in response to the predetermined scheduled, the FM subcarrier baseband signals when in the broadcast mode.

10. The broadcast transmitter in claim 9, wherein the means for receiving formatted data is further arranged to receive the data utilizing a High-Level Data Link Control protocol.

11. The broadcast transmitter in claim 10, wherein the High-Level Data Link Control protocol is to create an address field corresponding to the formatted data, such that wildcard values inserted into the address field allow fewer channels to handle multiple broadcast transmitters.

12. The broadcast transmitter in claim 9, wherein the encoded data corresponds to an output image resulting from the means for encoding hashing and placing packets within a frame received as the formatted data.

13. The broadcast transmitter in claim 9, wherein the means for encoding the formatted data is further arranged to split the formatted data into a first stream and a second stream, interleave bits from the first stream with bits from the second stream into separate segments, and merge the segments in producing the encoded data.

14. The broadcast transmitter in claim 13, wherein the means for encoding the formatted data is further arranged to divide the merged segments into predetermined segments wherein in each segment corresponds to a predetermined number of symbols, such that the encoded data is produced.

15. A broadcast transmitter that is arranged to broadcast data to a mobile device that is configured to receive data in a broadcast mode and a localcast mode, comprising:
- an input-output controller that is coupled to a wireless satellite input interface and coupled to a buffer memory, wherein the input-output controller is arranged to receive formatted data from a data source through the first input interface and store the formatted data in the buffer memory;
- a control processor that is coupled to the input-output controller and coupled to a local input interface, wherein the control processor is arranged to receive commands from the data source through the second input interface and adjust performance according to the received commands;
- an encoding engine that is coupled to the input-output controller and the control processor, wherein the encoding:
  - encodes a plurality of extracted data packets into a first portion of encoded data streams for transmission at a first latency and a second portion of encoded data streams for transmission at a second latency, wherein the second latency is lower than the first latency; and
  - interleaves the first and second portions of encoded data streams over a broadcast frame that includes sub frames, wherein: each sub frame includes data associated with the first portion and data associated with the second portion, interleaved together, and each of the extracted data packets associated with the first portion is interleaved across multiple subframes such that an output image is produced; and
- a subcarrier signal generator that is coupled to the encoding engine and the control processor, wherein the subcarrier signal generator modulates, filters, and amplifies the output image to produce an FM subcarrier baseband signal that is received by the mobile device receives.

16. The broadcast transmitter in claim 15, wherein the input-output controller is further arranged to receive the formatted data utilizing a High-Level Data Link Control protocol.

17. The broadcast transmitter in claim 15, wherein the encoding engine is further arranged to split the formatted data into a first stream and a second stream, interleave bits from the first stream with bits from the second stream into separate segments, and merge the segments in producing the encoded data.

18. The broadcast transmitter in claim 17, wherein the encoding engine is further arranged to divide the merged segments into predetermined segments wherein in each segment corresponds to a predetermined number of symbols, such that the output image is produced.

19. The broadcast transmitter in claim 15, wherein the subcarrier signal generator is further arranged to modulate data corresponding to the output image symbol by symbol under transmit clock timing.

20. The broadcast transmitter in claim 15, wherein the wherein the subcarrier signal generator is further arranged to modulate data corresponding to the output image utilizing quadrature phase shift keying.

* * * * *